United States Patent
Cheng et al.

(10) Patent No.: US 10,879,975 B2
(45) Date of Patent: Dec. 29, 2020

(54) BEAMFORMING BASED ON ADJACENT BEAMS SYSTEMS AND METHODS

(71) Applicant: Qualcomm Incorporated, San Diego, CA (US)

(72) Inventors: Shi Cheng, Sunnyvale, CA (US); Keangpo Ricky Ho, San Jose, CA (US); Sanghoek Kim, Hillsboro, OR (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/419,929

(22) Filed: Jan. 30, 2017

(65) Prior Publication Data

US 2017/0141830 A1 May 18, 2017

Related U.S. Application Data

(63) Continuation-in-part of application No. PCT/US2016/041405, filed on Jul. 7, 2016, and a
(Continued)

(51) Int. Cl.
*H04B 7/06* (2006.01)
*H04W 16/28* (2009.01)

(52) U.S. Cl.
CPC ......... *H04B 7/0617* (2013.01); *H04B 7/0632* (2013.01); *H04B 7/0682* (2013.01); *H04W 16/28* (2013.01)

(58) Field of Classification Search
CPC .... H04B 7/0695; H04B 7/088; H04B 7/0617; H04B 7/0697; H04B 7/0417; H04B 7/043;
(Continued)

(56) References Cited

U.S. PATENT DOCUMENTS

| 4,104,636 A | 8/1978 | Frazita |
| 7,369,879 B1 | 5/2008 | Steigerwald et al. |

(Continued)

FOREIGN PATENT DOCUMENTS

| JP | H04147079 A | 5/1992 |
| WO | WO-2012156570 A1 | 11/2012 |

(Continued)

OTHER PUBLICATIONS

ISA/EP, International Search Report and Written Opinion of the International Searching Authority, Int'l Application No. PCT/US2016/043766, dated Oct. 21, 2016, Korean Intellectual Property Office, Republic of Korea, 10 pgs.

(Continued)

*Primary Examiner* — Golam Sorowar
(74) *Attorney, Agent, or Firm* — Linda G. Gunderson; Holland & Hart LLP

(57) ABSTRACT

Systems and methods for beam splitting using multiple antennas are disclosed. An example wireless networking device includes an antenna system having a plurality of antennas; and a controller configured to select test beam antenna weight vectors (AWVs) configured to detect and/or localize a responder device, receive channel measurement responses corresponding to the test beam AWVs, determine a combined beam AWV directed substantially towards the responder device based, at least in part, on the test beam AWVs and/or the corresponding channel measurement responses, and configure the antenna sub-system to form a wireless communication channel according to the determined combined beam AWV between the wireless networking device and the responder device.

14 Claims, 6 Drawing Sheets

Related U.S. Application Data continuation-in-part of application No. PCT/US2016/043765, filed on Jul. 22, 2016, application No. 15/419,929, which is a continuation-in-part of application No. PCT/US2016/043766, filed on Jul. 22, 2016.

(60) Provisional application No. 62/189,929, filed on Jul. 8, 2015, provisional application No. 62/198,326, filed on Jul. 29, 2015.

(58) Field of Classification Search
CPC .... H04B 7/0626; H04B 7/063; H04B 7/0634; H04B 7/0837; H04W 16/28; H04W 64/00; H04W 64/006; H04W 8/005
See application file for complete search history.

(56) References Cited

U.S. PATENT DOCUMENTS

| | | | |
|---|---|---|---|
| 9,100,074 B1* | 8/2015 | Zhang | H04B 7/0626 |
| 9,871,574 B2 | 1/2018 | Chen | |
| 9,944,391 B2 | 4/2018 | Spengler et al. | |
| 2005/0156780 A1 | 7/2005 | Bonthron et al. | |
| 2005/0270229 A1 | 12/2005 | Stephens et al. | |
| 2006/0094449 A1 | 5/2006 | Goldberg | |
| 2006/0114157 A1 | 6/2006 | Kolanek et al. | |
| 2007/0298742 A1 | 12/2007 | Ketchum et al. | |
| 2008/0084350 A1* | 4/2008 | Uno | H04W 16/28 342/367 |
| 2008/0254752 A1 | 10/2008 | Oh et al. | |
| 2009/0224960 A1 | 9/2009 | Ishii et al. | |
| 2009/0309784 A1 | 12/2009 | Natsume | |
| 2010/0054200 A1* | 3/2010 | Tsai | H04B 7/0408 370/329 |
| 2010/0321234 A1 | 12/2010 | Goldman | |
| 2011/0065448 A1* | 3/2011 | Song | H04B 7/0632 455/452.2 |
| 2011/0071789 A1 | 3/2011 | Han et al. | |
| 2011/0105032 A1 | 5/2011 | Maruhashi et al. | |
| 2011/0235533 A1 | 9/2011 | Breit et al. | |
| 2013/0182666 A1 | 7/2013 | Sutskover et al. | |
| 2014/0022116 A1 | 1/2014 | Lee et al. | |
| 2014/0334566 A1* | 11/2014 | Kim | H04B 7/0469 375/267 |
| 2015/0015448 A1 | 1/2015 | Almog et al. | |
| 2015/0030094 A1 | 1/2015 | Zhang | |
| 2016/0087695 A1* | 3/2016 | Wang | H04B 7/0695 375/267 |
| 2016/0233178 A1 | 8/2016 | Lamy et al. | |
| 2016/0277094 A1* | 9/2016 | Ying | H04B 7/0456 |
| 2017/0029107 A1 | 2/2017 | Emami et al. | |
| 2017/0033468 A1 | 2/2017 | Wong | |
| 2017/0041895 A1 | 2/2017 | Gan et al. | |
| 2017/0059688 A1 | 3/2017 | Gan et al. | |
| 2017/0142605 A1 | 5/2017 | Cheng et al. | |
| 2017/0222315 A1 | 8/2017 | Hozouri | |
| 2018/0025651 A1 | 1/2018 | Anderson | |
| 2018/0136645 A1 | 5/2018 | Hong et al. | |
| 2018/0157255 A1 | 6/2018 | Halverson et al. | |
| 2018/0210075 A1 | 7/2018 | Kim et al. | |
| 2019/0120954 A1 | 4/2019 | Kim et al. | |
| 2019/0230671 A1 | 7/2019 | Kim et al. | |

FOREIGN PATENT DOCUMENTS

| | | |
|---|---|---|
| WO | WO-2013085468 A1 | 6/2013 |
| WO | WO-2014074894 A1 | 5/2014 |

OTHER PUBLICATIONS

ISA/EP, International Search Report and Written Opinion of the International Searching Authority, Int'l Application No. PCT/US2016/043765, dated Oct. 21, 2016, Korean Intellectual Property Office, Republic of Korea, 12 pgs.

Nanzer J.A., et al., "A 29.5 GHz Radar Interferometer for Measuring the Angular Velocity of Moving Objects", IEEE—MTTS International Microwave Symposium. Digest, IEEE, US, Jun. 2, 2013, XP032545821, ISSN: 0149-645X, DOI: 10.1109/MWSYM.2013.6697333 [retrieved on Dec. 27, 2013], pp. 1-3.

Supplementary European Search Report—EP16831171—Search Authority—Munich—dated Feb. 20, 2019.

* cited by examiner

BEAMFORMING BASED ON ADJACENT BEAMS SYSTEMS AND METHODS

CROSS-REFERENCE TO RELATED APPLICATIONS

This application is a continuation-in-part of International Patent Application No. PCT/US2016/041405 filed on Jul. 7, 2016 and entitled "SYSTEMS AND METHODS OF INTERFERENCE MITIGATION FOR CONCURRENT LINKS IN BEAMFORMED COMMUNICATION," which is hereby incorporated by reference in its entirety. International Patent Application No. PCT/US2016/041405 claims the benefit of and priority to U.S. Provisional Patent Application No. 62/189,929 filed on Jul. 8, 2015 and entitled "SYSTEMS AND METHODS OF INTERFERENCE MITIGATION FOR CONCURRENT LINKS IN BEAMFORMED COMMUNICATION," which is hereby incorporated by reference in its entirety.

This patent application is also a continuation-in-part of International Patent Application No. PCT/US2016/043765 filed on Jul. 22, 2016 and entitled "ANGLE AND POSITION SENSING USING ARRAYS OF ANTENNAS," which is hereby incorporated by reference in its entirety. International Patent Application No. PCT/US2016/043765 claims the benefit of and priority to U.S. Provisional Patent Application No. 62/198,326 filed on Jul. 29, 2015 and entitled "WIRELESS CONTROL OF DRONE WITH DISTANCE RANGING AND CHANNEL SENSING," which is hereby incorporated by reference in its entirety.

This patent application is also a continuation-in-part of International Patent Application No. PCT/US2016/043766 filed on Jul. 22, 2016 and entitled "ANGULAR VELOCITY SENSING USING ARRAYS OF ANTENNAS," which is hereby incorporated by reference in its entirety. International Patent Application No. PCT/US2016/043766 claims the benefit of and priority to U.S. Provisional Patent Application No. 62/198,326 filed on Jul. 29, 2015 and entitled "WIRELESS CONTROL OF DRONE WITH DISTANCE RANGING AND CHANNEL SENSING," which is hereby incorporated by reference in its entirety.

TECHNICAL FIELD

The present disclosure relates generally to beamforming, and in particular, to beamforming architectures and techniques for improving radio frequency transmissions.

BACKGROUND

Beamforming technologies have been used in the wireless and millimeter wave (i.e. radio frequency) application space to increase directional antenna array gain. For example, devices using wireless communication technologies, such as cellphones, laptops, and other portable electronic devices, may include multiple transmission and reception antennas or arrays that are configured to transmit and receive communications over a single spatial stream/beam.

Increases in antenna array gain facilitate a better quality of signal transmission and reception. To provide antenna array gain in a particular direction, conventional beamforming architectures often use a fixed set of weights (e.g., amplitude and phase) to configure the antenna array. However, the fixed set of weights correspond to a fixed set of directions relative to the antenna array orientation, and so the resulting directional antenna array gain can often be poorly aligned relative to an optimum alignment, such as between two electronic devices. As the desired bandwidth capacity and the number of mobile electronic devices in typical environments increases, wireless transmissions become more susceptible to noise, signal reflections, and interference caused by nearby interferee devices, all of which can change over time due to the mobility of the various devices. Thus, there is a need in the art for methodologies to refine the directionality of the beamforming and the resulting antenna array gain, particularly in the context of mobile transmitters and/or receivers.

Figure 1:
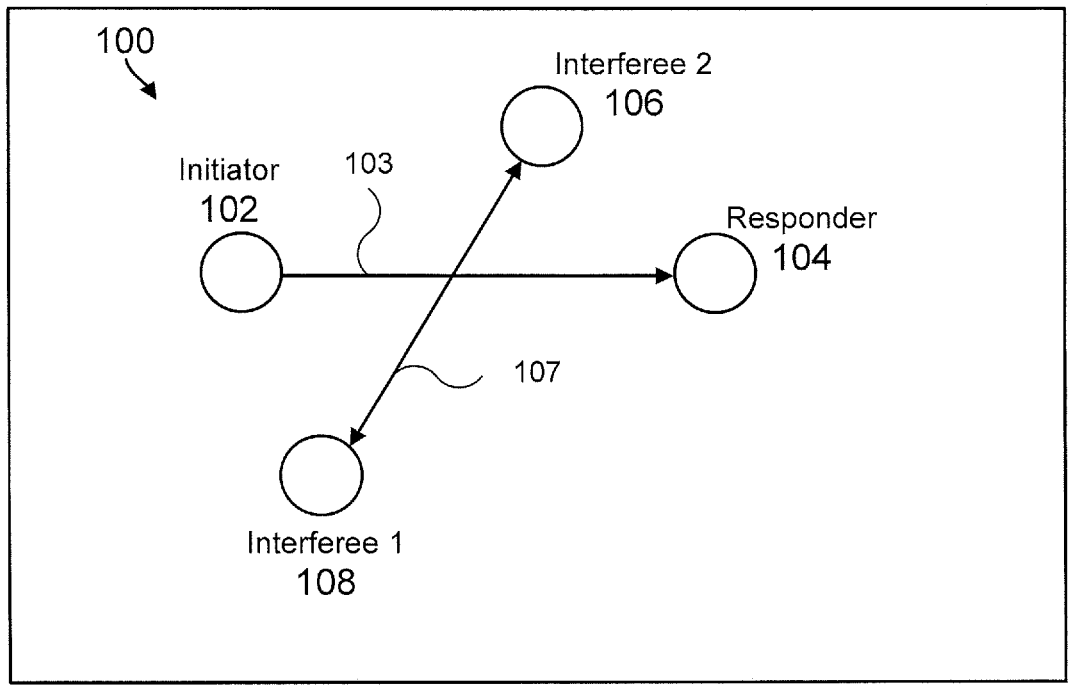
FIG. 1 is a schematic view illustrating an embodiment of a wireless communication system that forms beams based on adjacent beams.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for beamforming based on accumulating channel measurements associated with a selected set of test beams and then combining the test beams to form a relatively high gain beam, but without requiring a search or comparison among the channel measurements. Thus, embodiments of the present disclosure may be configured to provide relatively fast and accurate beamforming as compared to conventional techniques, which can result in increases in both the instantaneous and time averaged gain, bandwidth, and/or channel quality seen by devices in a wireless communication network. Moreover, the increased speed and accuracy of the beamforming also allows embodiments to form and maintain wireless communications networks using less electrical power and/or compute resources than that used by conventional methodologies, particularly in environments with many devices where beam accuracy helps to reduce overall noise and interference in the network transmissions.

For example, when forming a beam to a responder device (also referred to a receiver device in the present disclosure), an initiator device (also referred to as a transmitter device) may be configured to form one or more test transmitter beams configured to detect (e.g., identify as within a transmission/reception range) and/or localize (e.g., assign to a particular spatial area relative to the initiator device, typically characterized by a range of beam directions relative to the antenna of the device) a responder device. The initiator device may gather channel measurement information related to the test beams, from the responder device and/or from various non-participating devices, and then form a combined transmitter beam based on the test beams and the channel measurement information. The responder device may be configured to form one or more test receiver beams configured to localize the responder device, perform channel measurements corresponding to the test beams, and then form a combined receiver beam based on the test beams and the channel measurements. In some embodiments, the initiator device may be configured to determine the characteristics of the combined transmitter beam from channel measurement information provided by the responder device and/or from various non-participating devices. In other embodiments, the responder device may be configured to determine the characteristics of the combined transmitter beam and provide the characteristics as channel measurement information to the initiator device, thereby reducing the compute resource load on the initiator device.

Depending on the phase shift capability of the initiator device and/or the responder device, the combined beams may not be directed exactly at the initiator/responder devices, but the combined beams may still be used to provide better communication performance than conventional beamforming techniques, particularly when the devices are in motion relative to each other and the beamforming should reliably and quickly track the relative locations of the devices. While this disclosure refers to initiator devices and responder devices separately, it should be understood that both devices typically include similar or the same beamforming and signal transmission/reception infrastructure and that their roles may be reversed in the beamforming techniques described herein.

In addition, the methodologies described herein can be configured to provide the following technical advantages. First, when there are two or more responder devices, an initiator device may use a combined beam to communicate with these responder devices and provide an optimal overall performance. Compared to having to form individual beams to communicate with each of the responder devices, these techniques can be more efficient than conventional means both in terms of compute resource utilization and power usage. Second, an initiator and/or responder device may be mobile and its location may change from time to time; a user may move a user device between different locations. Forming individual beams at these locations using conventional means may be energy inefficient and technically burdensome, as a conventional transmitter device often needs to determine a responder device's present location before performing a beamforming process. Third, directing a beam straight at a participating device's location may not provide an optimal signal gain, such as if the interference in the resulting communication channel caused by an intereferee device is present. Embodiments of the present disclosure can be configured to direct a beam at the participating device's general location but adjusted away from the device so as to reduce interference by an interferee device, and without a need to determine or search the exact locations of the participating devices and the interferee device prior to forming a beam that compensates for both the interference and the positions of the participating devices. Additional details of implementations are now described in relation to the figures.

FIG. 1 is a schematic view illustrating an embodiment of a wireless communication system 100 that forms beams based on adjacent beams. As shown in FIG. 1, system 100 may be implemented with a single user (SU) multi-input-multi-output (MIMO) communication channel 103 between an initiator device 102 and a responder device 104. Before establishing communication channel 103 with responder device 104, initiator device 102 may try to detect the presence (or absence) of devices that are neither intended responders nor invited participants of a communication network including initiator device 102 and responder device 104. The unintended responders or uninvited participants are also referred to as non-participating devices in the present disclosure. A non-participating device (e.g., interferees 106 and 108) and/or associated communication channel (e.g., communication channel 107) may negatively impact communication channel 103 between initiator device 102 and responder device 104, for example, when the non-participating device or associated communication channel is competing with initiator device 102, communication channel 103, or responder device 104 for a shared communication medium. A non-participating device that negatively impacts a communication channel between two other participating devices is thus also referred to as an interferee device, because the non-participating device may interfere with either an initiator device, a responder device, or both.

In some implementations, therefore, initiator device 102 may perform a beamforming process in order to communicate with responder device 104. This beamforming process may include first generating one or more test beams directed approximately at the location of responder device 104. Note that the test beams are not necessarily generated at the exact direction or location of responder device 104; rather, the test beams may be directed towards directions or locations that are within predefined degrees or variations from those of responder device 104, or that may be distributed across the full range of available directions (e.g., only limited by the antenna sub-system of initiator device 102). For example, initiator device 102 may direct first and second test beams that are 5 degrees, 10 degrees, or more different from the actual direction to responder device 104. Responder device 104 may receive transmissions over the two test beams and respond to initiator device 102 with two respective sets of channel measurements (e.g., signal gain and/or signal-to-noise (SNR) ratio measurements) and/or other types of channel measurement responses including channel measurement information, as described herein. Using these sets of channel measurements and/or other channel measurement information, initiator device 102 may form a combined beam based, at least in part, on the test beams and the channel measurement information, that is substantially optimally aligned with the direction to responder device 104, and then communicate with responder device 104 over the combined beam.

Figure 2:
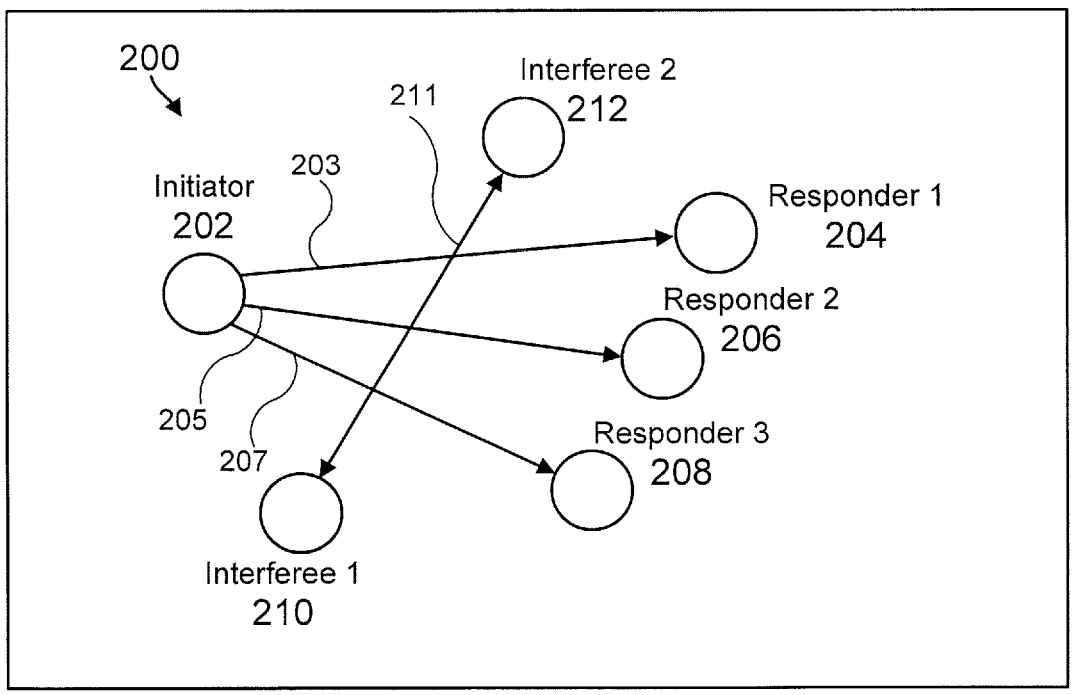
FIG. 2 is a schematic view illustrating an embodiment of a wireless communication system that forms beams based on adjacent beams.

FIG. 2 is a schematic view illustrating an embodiment of a wireless communication system 200 that forms beams based on adjacent beams. In FIG. 2, system 200 includes one initiator device 202 and several responder devices (e.g., 204, 206, 208) each with individual communication channels 203, 205, 207, in an environment with multiple interferees 210 and 212 and associated communication channel 211. Before forming beams to communicate with the responder devices 204, 206, and 208, initiator device 202 may form a first set of test beams directed at responder device 204, a second set of test beams directed at responder device 206, and a third set of test beams directed at responder device 208. Alternatively, initiator device 202 may form a single set of test beams directed at or at least covering all responder devices 204, 206, and 208. Responder devices 204 and 208 may, in response, provide channel measurements back to initiator device 202. Based on these channel measurements, initiator device 202 may form combined beams directed at responder devices 204, 206, and 208 (e.g., individually using the different sets of test beams, or by identifying three local maximum channel responses corresponding to the three responder devices and combining test beams within a particular angular diameter of the maximum channel responses, as described more fully herein). In other embodiments, initiator device 202 may form a single combined beam in the general direction of responder devices 204, 206, 208 that is configured to support all three respective communication channels 203, 205, 207.

A combined beam may be formed using an adaptive and/or an iterative method. To form a beam, an initiator device may be configured to collect channel measurement information associated with one or more test beams and calculate an optimal beamforming vector. A beamforming vector may be considered optimal when a beam formed based on the beamforming vector can provide signals with a predefined minimum gain; when a beam formed based on the beamforming vector can support a communication channel using less than a predefined maximum power allotment; when a beam formed based on the beamforming vector has an SNR that is equal to or higher than a predefined minimum SNR; and/or when a beam formed based on the beamforming vector provides interference to a non-participating device equal to or below a predefined maximum allowed interference (e.g., which can be measured as a ratio of SNR at the non-participating device when the beam is on to the SNR at the non-participating device when the beam is off).

In various embodiments, a set of test beams may be characterized generally by a matrix as applied to an antenna array, where each row or column of the matrix is made up of complex amplitude weight vectors (AWVs) and each AWV is configured to generate one of the test beams in the set of test beams when applied to an antenna sub-system of an initiator device or a responder device (e.g., to control the amplitudes and/or phases of signals generated at each antenna in the antenna array). Such matrix may be invertible and/or an orthogonal matrix. In some embodiments, a Hadamard matrix can be used to designate the set of test beams in order to improve the overall SNR of the set of test beams characterized by the matrix. For example, using a square Hadamard matrix, each test beam turns on all the antennas in the corresponding antenna array with an AWV corresponding to the nth row of the N×N Hadamard matrix M, where each row is a different AWV/test beam, and where N represents the number of antennas in the antenna array of the corresponding transmitter or receiver device. When the rows/AWVs of the Hadamard matrix are applied to the phase shifter of the antenna array (e.g., the device that adjusts the phases of the signals generated or received by the individual antennas in the array), the corresponding channel measurements may be characterized as the column vector r=Mh (e.g., where h is channel response column vector h). By multiplying the measurement r by the transpose of the Hadamard matrix M, the channel response h may be calculated using the equation (1) shown below:

$$M^H r = Nh \quad (1)$$

In equation (1), $^H$ represents the Hermitian transpose. Although the Hermitian transpose of Hadamard matrix is the same as its transpose, the Hermitian transpose is used in equation (1) as a notation for the more general case. In equation (1), the relationship that $M^H M = NI_N$
$M^H M = NI_N$ is used, as the Hadamard matrix is defined as composed of orthogonal vectors.

In various embodiments, a Hadamard matrix may be desirable to use to characterize the set of test beams because all of the entries of a Hadamard matrix are either +1 or −1, which can simplify multiplication processing and may allow the use of phase-only AWVs. In related embodiments, a complex Hadamard matrix may be used or a discrete Fourier transform (DFT) matrix may be used with similar benefits. For example, a complex Hadamard matrix may also allow the use of phase-only AWVs. A complex Hadamard matrix may also have entries that are solely +1, −1, +j, and −j, which can simplify the design of the phase shifter used to generate the test beams using the antenna array.

After the determination of the channel response h, the optimal beamforming vector may be determined as the vector (e.g., expressed as a row vector) in the direction proportional to $h^H$. In one embodiment, optimal beamforming vector $h^H$ may be scaled to unity norm and applied as the optimal AWV for the antenna array. In another embodiment, the AWV for the antenna array may be phase only and the phases proportional to the elements of $h^H$ may apply to each antenna accordingly. In various embodiments, a constant phase shift applied to all the elements of an AWV does not affect the beamforming performance of the AWV, and so a constant phase shift may be added to or removed from all elements of each determined AWV in order to simplify the AWV or make implementing the AWV more convenient for a particular antenna sub-system, for example.

As shown in equation (1), the use of a Hadamard matrix can improve the SNR for the channel response h by the factor of N (e.g., relative to just measuring the channel response h directly). In a trivial example with very low efficiency, the optimal beamforming vector can be derived by scanning the antenna beam to different angles and selecting the AWV producing the maximum power as indicated in a channel measurement response. For an antenna array with N elements, the trivial measurement of h requires a total of N measurements, and the angular accuracy of the measurements depends on the SNR. The trivial angular scan may result in a somewhat sub-optimal but workable beamforming vector, but at the expense of a far more exhaustive and inefficient angle search, even when the approximate optimal angle is known beforehand to help guide the exhaustive search, at least in part due to the relatively poor SNR.

Figure 3:
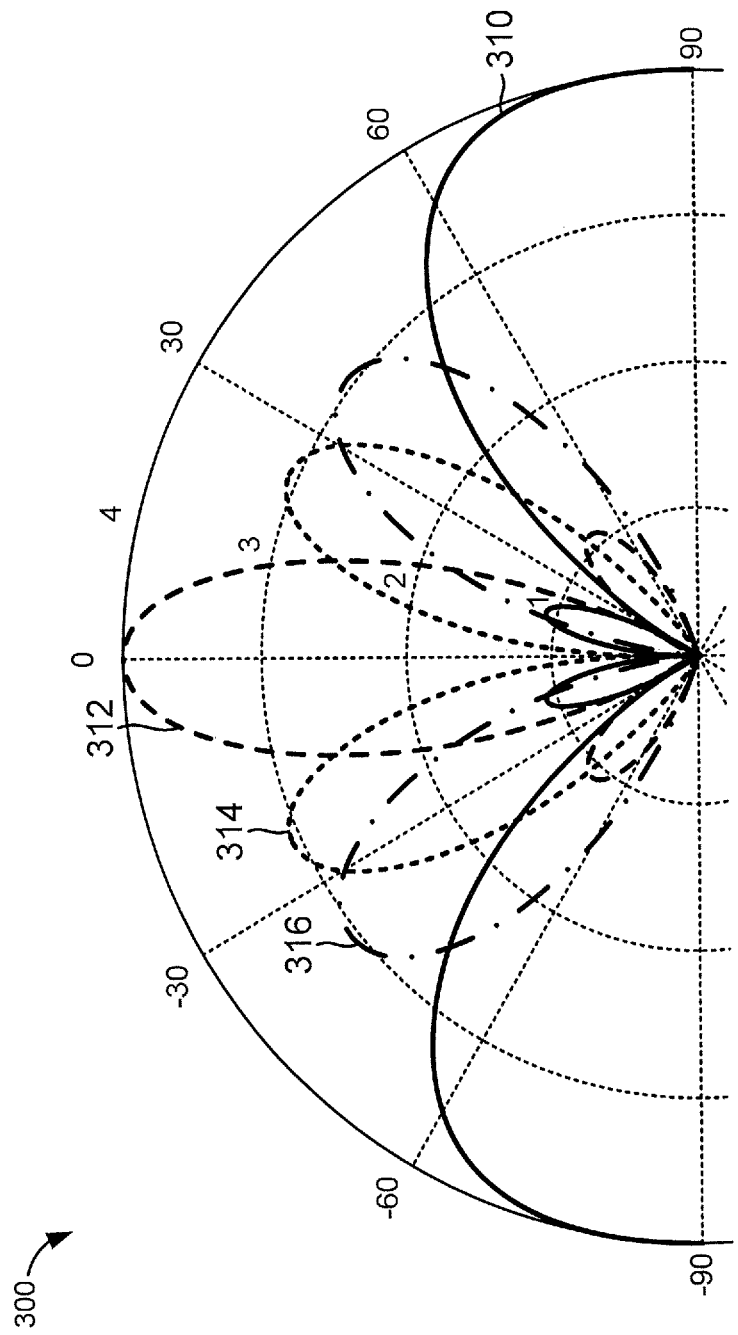
FIG. 3 is a schematic view illustrating an example set of test beams in accordance with an embodiment of the present disclosure.

FIG. 3 is a schematic view illustrating an example set of test beams 300 corresponding to the 4×4 Hadamard matrix. As shown in FIG. 3, beams formed based on a Hadamard matrix M are not necessarily narrow beam and may include wide beams with multiple peaks. As shown in FIG. 3, each of beams 310, 314, and 316 include two peaks, but fail to provide sufficient signal gain in their corresponding angles. Using a DFT matrix can solve such issues and produce beams with sufficient energy gain (e.g., similar to beam 312) and with good angular coverage, but the beams formed using a DFT matrix may be spatially sparse/have relatively low spatial density. Similarly, as shown in FIG. 3, if the specific antenna sub-system focuses only on the angles ±45° to the front of the initiator/responder device, some portions of the Hadamard patterns in M may represent wasted energy and effort. Instead of a square Hadamard matrix (or a similar DFT matrix), a K×N transmitter or receiver AWV matrix of X may be used to characterize the test beams, for a total of K test beams and corresponding test beam AWVs and channel measurements. All of the K test beams may be selected to localize a participating device or focus around a particular locale or direction, such as that corresponding to the optimal beam in a previous iteration. Then, the results of the measurements may be combined using the techniques described herein to produce the optimal beam/combined beam AWV.

Figure 4:
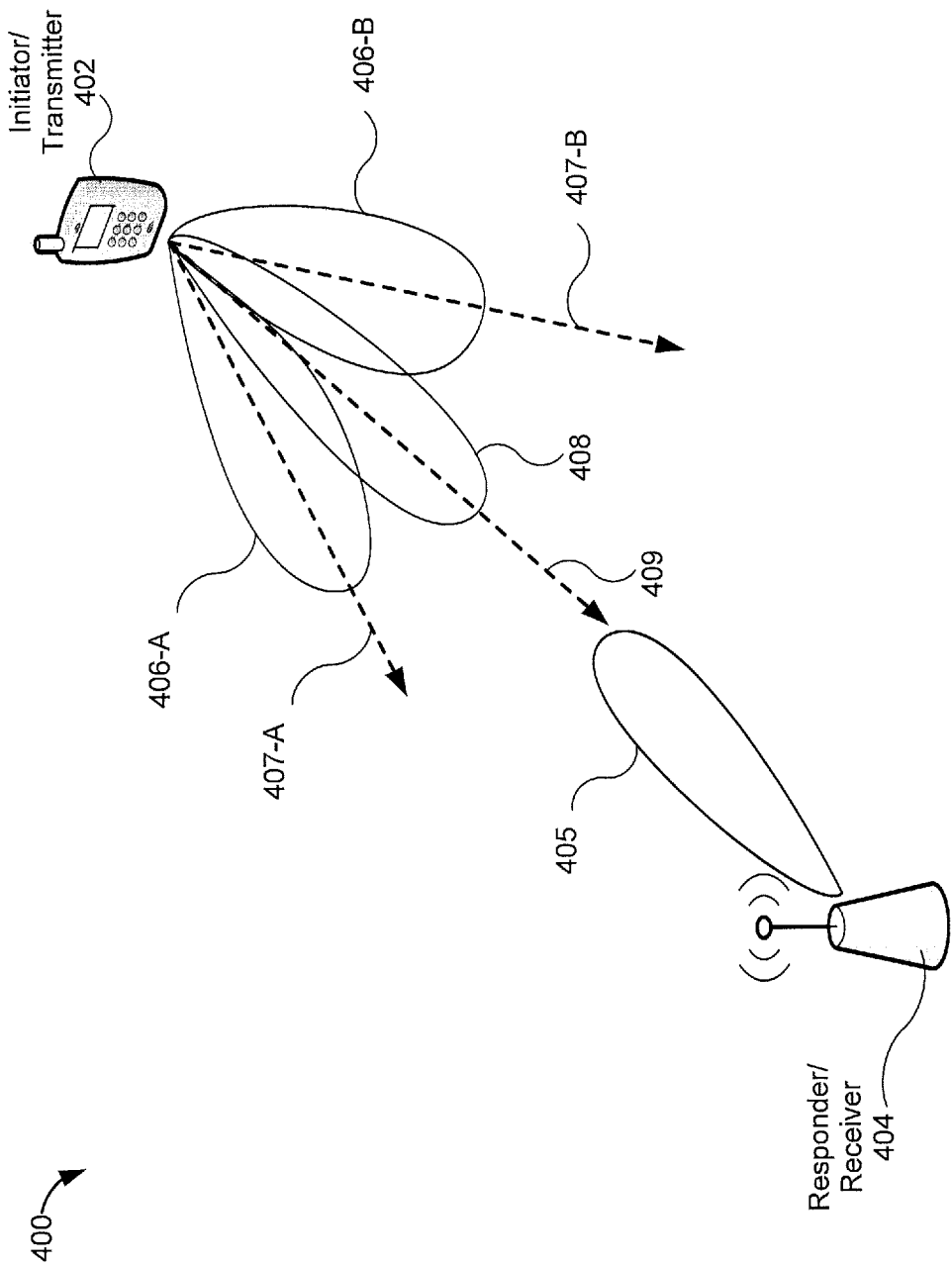
FIG. 4 is a schematic view illustrating an embodiment of a wireless communication system providing various beamforming features.

FIG. 4 is a schematic view illustrating an embodiment of a wireless communication system providing various beamforming features. In the embodiment shown in FIG. 4, a combined beam 408 along direction 409 is formed based on the combination of two test beams 406-A and 406-B along respective directions 407-A and 407-B, using any of the various techniques described herein. Hence, in the above formula, K=2. With certain prior knowledge from a previous beamforming process, handset/initiator device 402 may be configured to form two test beams 406-A and 406-B pointing approximately towards access point/responder device 404 and/or its test beam 405, as shown. After channel measurements are performed and transmitted back to initiator device 402 for test beams 406-A and 406-B, they are combined to form combined beam 408 that is directed more accurately at responder 402. In the embodiment shown in FIG. 4, the number of antennas N is not specified, but it may be much larger than K.

Before forming combined beam 408, initiator/transmitter device 402 may form test beams 406-A and 406-B. In some embodiments, initiator device 402 may form test beams 406-A and 406-B with devices other than responder device 404, such as an interferee device or a non-participating device that is present within a predefined proximity to responder device 404, for example. In the process of selecting and forming test beams 406-A and 406B, initiator device 402 may try to detect the presence of and approximate directions to or locations of non-participating devices. For example, initiator device 402 may broadcast Request-To-Send (RTS) packets to identify any devices present within a predefined range of initiator device 402 (e.g., omnidirectionally, with a predefined radius, such as 30 feet or more, which may be based on maximum allowable time delay measurements and/or minimum allowable SNR measurements, for example), and for identified devices, their approximate location. Devices located within the predefined range may respond to the RTS packet by sending a reply signal or packet (e.g., optionally including various other channel measurement information).

Based on the reply received from a device that has responded to the RTS, initiator device 402 may determine whether the device is a participating device or a non-participating device or an unintended responder, e.g., based on a device or network identifier or other information included in the reply. If the device is a participating device (e.g., responder 404), initiator device 402 may form a set of test beams (e.g., test beams 406-A and 406-B) and obtain channel measurement information associated with the device and the test beams. Initiator device 402 can then, based on channel measurement responses received from the device, determine, at least in part, how to form combined beam 408, such as determining a combined beam AWV corresponding to combined beam 408 and/or direction 409. In alternative embodiments, responder device 404 may determine a combined beam AWV for initiator device 402, based on the same channel measurements, and then provide the combined beam AWV to initiator device 402 as channel measurement information forming at least a portion of the channel measurement responses, such as over a communication channel formed between initiator device 402 and responder device 404 (e.g., formed over combined beam 408 and/or test beam 405). Once combined beam 408 for initiator device 402 (e.g., a transmitter combined beam) is determined or extracted from the channel responses, responder device 404 may then perform a similar process with a set of receiver test beams (e.g., similar to test beams 406-A and 406-B, but about test beam 405) and then determine a receiver combined beam (e.g., similarly oriented as test beam 405) based on the channel measurements for each receiver test beam, and without requiring data transfer between initiator device 402 and responder device 404.

Channel responses, AWVs, matrices, other beamforming information, and/or other data and/or information may be communicated between initiator device 402 and responder device 404 while determining combined beams therebetween, such as over test beams 406-A and/or 406-B and test beam 405, for example, or over other beams and/or other wireless or wired communication channels, which can in some embodiments be configured to operate reliably at relatively low bitrates. In various embodiments, such information may require only relatively low bitrates to facilitate operation of the methods described herein.

If a device is a non-participating device (e.g., interferee 210 or 212 of FIG. 2), initiator device 402 may form a set of test beams (e.g., similar to test beams 406-A and 406-B) and obtain channel measurement information associated with the non-participating device and the test beams. Initiator device 402 can then, based on channel measurement responses received from the non-participating device, determine, at least in part, how to form combined beam 408, such as determining a combined beam AWV corresponding to combined beam 408 that takes into account interference by one or more non-participating devices. Initiator device 402 may form test beams and corresponding communication channels up to a predefined number of non-participating devices (e.g., 1-3 or 2-6) and form combined beam 408 based, at least in part, on the channel measurement information collected from these non-participating devices. For example, initiator device 402 may be configured to form combined beam 408 such that emissions towards the non-participating devices are reduced (e.g., to reduce interference of combined beam 408 on communications among the non-participating devices), based on the channel measurement information obtained from those devices. In some embodiments, initiator device 402 may disregard non-participating measurement information and use only channel measurement information that is representative of a communication channel between participating devices (e.g., initiator 402 and responder 404). In other embodiments, combined beam 408 may be formed by determining a subset of test beam AWVs providing the largest responses from non-participating devices and adjusting weight factors (e.g., reducing their value and/or making them negative) corresponding to the subset of test beam AWVs to reduce emission energy of combined beam 408 in directions corresponding to the subset of test beam AWVs.

In various embodiments, test beams 406-A and 406-B may be formed based on one or more communications between initiator device 402 and responder device 404. To form test beams 406-A and 406-B, initiator device 402 may determine the relative location of responder device 404 based on previous communications with responder device 404, including prior determined combined beam AWVs, for example. Alternatively, initiator device 402 may try to detect the location of responder device 404 on-the-fly, for example, at the time of selecting and forming a set of test beams, to accommodate initiator device 402 and/or responder device 404 entering the wireless communications network or being mobile (e.g., a vehicle, a laptop, a smartphone, or other portable electronic device) with its location potentially changing from time to time.

In embodiments where an approximate or estimated location of responder device 404 is known, initiator device 402 may select and form test beams 406-A and 406-B such that test beams 406-A and 406-B are distributed within a predetermined angular diameter centered at the estimated location of responder device 404, where the distribution density and/or pattern is defined by the capabilities of the associated antenna sub-system and/or various other application constraints, such as channel direction update rate and/or expected relative velocities or speeds of devices (e.g., based on one or more prior determined combined beams). For example, test beam 406-A may be directed along direction 407-A at a location that is 3-10 degrees away from the location of responder device 404; test beam 406-B may be directed along direction 407-A at a location that is within a 10 degree angle from a straight line between initiator device 402 and responder device 404 (e.g., such that both test beams 406-A and 406-B are substantially within a 20 degree angular diameter centered about responder 404).

After test beams 406-A and 406-B are formed, initiator device 402 may obtain channel measurement information in the form of channel measurement responses from responder device 404. In some embodiments, channel measurement information may include signal strength, signal gain, SNR, time of test beam reception, time of channel measurement response transmission, time delay, device identifier, and/or other channel measurement information. Based on the channel measurement information/responses associated with test beams 406-A and 406-B, initiator device 402 may form combined beam 408 and use combined beam 408 as a wireless communication channel to communicate data and/or other signals and information with responder device 404. Alternatively, as noted above, responder device 404 may be configured to determine a combined beam AWV corresponding to combined beam 408 and provide the combined beam AWV to initiator device 402 as channel measurement information (e.g., to offload computational resource needs of initiator 402), and initiator device 402 may be configured to form combined beam 408 based on that combined beam AWV and use combined beam 408 as a wireless communication channel to communicate data and/or other signals and information with responder device 404.

In various embodiments, initiator device 402 may be configured to form more than two test beams and collect a set of channel measurement information corresponding to all test beams. When generating combined beam 408, initiator device 402 may take into account all the collected channel measurement responses, from both participating and non-participating devices, or alternatively only a subset of the available channel measurement information. When taking all available channel measurement information into account, for example, an initiator device may generate a combined beam that may be more efficient (e.g., a communication channel that is energy efficient and yet provides a more than predefined minimum amount of signal gain). When taking only a subset of available channel measurement information into account, for example, an initiator device may disregard non-participating measurement information and use only channel measurement information that is representative of a communication channel between participating devices (e.g., initiator 402 and responder 404). Also, when there are multiple responder devices (e.g., as in FIG. 2), it may be difficult or even impossible to generate a single combined beam to communicate with all the responder devices above a predefined minimum signal gain and/or SNR. For example, if there are five responder devices, and an initiator device forms a set of test beams for each responder device, the initiator device may have to assimilate and process ten or more different channel measurement responses. Using all available channel measurement information collected from different devices may result in a combined beam having a wider shape and lower signal gain than desired, and so in some embodiments, an initiator device may be configured to segregate some or all the participating devices into different groups of segregated participating devices and form a combined beam for each segregated group of devices. In some embodiments, an initiator device may be configured to receive a set of responder-determined combined beam AWVs one each from the multiple responder devices and determine one or more adjusted combined beam AWVs from the set of responder-determined combined beam AWVs (e.g., grouped according to minimum signal gain and/or SNR for participating devices so as to minimize the number of active and/or necessary combined beam AWVs to enable communication throughout the various devices).

Figure 5:
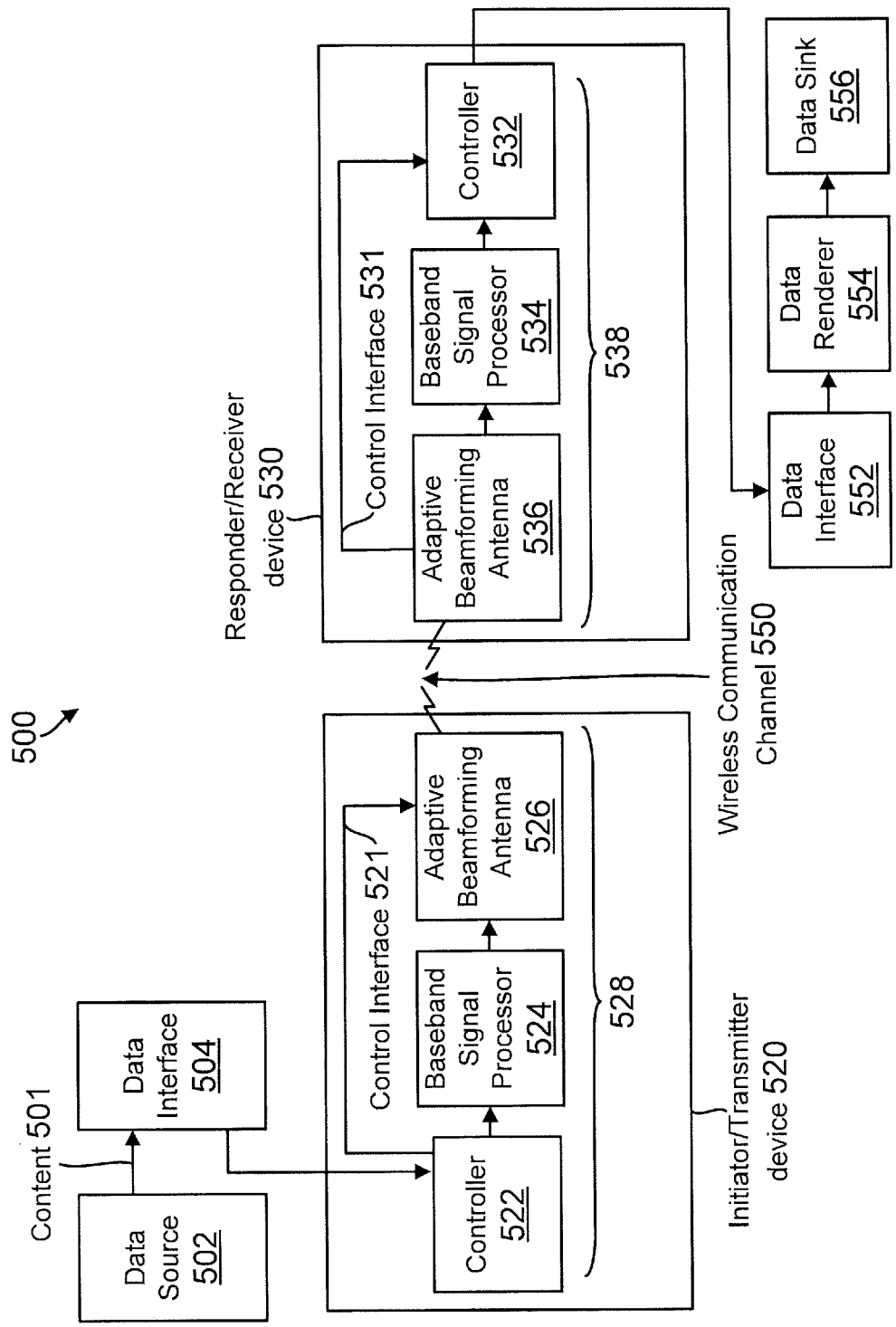
FIG. 5 is a schematic view illustrating an embodiment of a wireless communication system.

FIG. 5 is a schematic view illustrating an embodiment of a wireless communication system 500 in which beamforming based on adjacent beams may be implemented. Wireless communication system 500 may include a data source 502, a data interface 504, an initiator/transmitter device 520, a responder/receiver device 530, a data interface 552, a data renderer 554, and a data sink 556. Data source 502 may store data and provide data to initiator device 520 for transmission to responder device 530. Data source 502 may be a computing device providing data for transmission to another computing device (e.g., data sink 556). In some implementations, data source 502 may be a routing device to connect to a wide area network. In various embodiments, data source 502 may be a laptop, a smartphone, a tablet computer, a desktop computer, a notebook computer, and/or other user device, and in some embodiments may incorporate data interface 504 and initiator device 520. Data interface 504 may obtain data from data source 502 and provide it to initiator device 520.

Initiator device 520 and responder device 530 (e.g., wireless networking devices) may be implemented with similar hardware components and may wirelessly communicate with each other and with other participating and non-participating devices, as described herein. Initiator and responder devices 520 and 530 may be implemented as half-duplex or full duplex wireless communication devices. Initiator device 520 may include a controller 522, a baseband signal processor 524, an adaptive beamforming antenna 526, and a wireless communication channel interface (e.g., also referred to as an antenna sub-system) 528, which may include all or portions of controller 522, baseband signal processor 524, and/or adaptive beamforming antenna 526, as shown. Transmitter device 530 may include a controller 532, a baseband signal processor 534, an adaptive beamforming antenna 536, and a wireless communication channel interface/antenna sub-system 538, which may include all or portions of controller 532, baseband signal processor 534, and/or adaptive beamforming antenna 536, as shown. The controllers (522 or 532) may be configured to perform various beamforming operations, including operations facilitating determining a combined beam AWV according to one or more of the methodologies described herein.

The baseband signal processor (524 or 534) may be configured to manage radio functions (e.g., Wi-Fi and Bluetooth radio functions, as well other functions or wireless communication protocols that utilize an antenna or antenna array) of an associated antenna sub-system. In various embodiments, an antenna sub-system of initiator device 520 or responder device 530 (e.g., wireless communication channel interface 528 or 538) typically includes at least an adaptive beamforming antenna (e.g., adaptive beamforming antenna 526 or 536) and may be configured to transmit and/or receive beamformed wireless transmissions, as described herein. In various embodiments, wireless communication channel interface 528 and/or 538 may include one or more adaptive beamforming antennas to transmit beamformed wireless transmissions, and one adaptive beamforming antennas to receive beamformed wireless transmissions. In additional embodiments, one or more antenna elements of adaptive beamforming antenna 526/536 may be configured to transmit or receive non-beamformed signals (e.g., such as a single antenna element configured for substantially omnidirectional transmission/reception). In further embodiments, wireless communication channel interface 528 and/or 538 may include a separate omnidirectional antenna.

Wireless communication channel interfaces 528 and 538 may be configured to allow their respective devices to communicate with each other over wireless communication channel 550, which may be a Wi-Fi network or other standard or proprietary wireless communications network, for example, and be characterized by a combined beam AWV and implemented by a corresponding combined beam, as described herein. For example, controller 522 may be configured to select a set of test beam AWVs configured to detect and/or localize responder device 530, receive a corresponding set of channel measurement responses from responder device 530, determine a combined beam AWV, and configure antenna sub-system 528 to form wireless communication channel 550 according to the determined combined beam AWV between initiator device 520 and responder device 530.

Controllers 522/532, baseband signal processors 524/534, and adaptive beamforming antennas 526/536 may each be implemented as or with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of initiator 520 and/or responder 530, for example. Such software instructions may also implement methods for transmitting and receiving packets, beamforming communication channels, determining channel measurement information, querying devices for operational parameters, selecting operational parameters for devices, and/or performing any of the various methods described herein.

The adaptive beamforming antenna (526 or 536) may be configured to perform adaptive spatial signal processing with an array of transmitters or receivers and corresponding antennas/antenna elements. The signals may be combined in a manner to increase signal strength to/from a chosen direction and/or to form wireless communication channel/communication link 550 (e.g., constructive signals). Signals to/from other directions may be combined in a destructive manner, resulting in degradation/reduction in signal strength of the signals to/from the undesired directions (e.g., destructive interference). The control interface (521 or 531) enables a controller to manage an adaptive beamforming antenna, e.g., including changing antenna direction, adjusting signal strength towards particular direction, and/or other beamforming functions. Controller 532 of responder device 530 may be communicatively connected with data interface 552, which allows responder device 530 to interact with (e.g., storing, modifying, and/or communicating data) data sink 556 through data renderer 554, which may be configured to format data appropriately for data sink 556. In some implementations, components 522, 524, and 526 (or 532, 534, and 536) are collectively referred to as a wireless communication channel interface, as shown.

Various methods can be used to determine and/or form a combined beam directed at a participating (e.g., initiator/responder) device. For example, instead of square Hadamard matrix (or the similar DFT matrix), a K×N initiator or responder test beam AWV matrix X may be used to characterize the test beams, for a total of K test beams. The K test beams may be selected to be focused around a particular direction, such as an optimal combined beam determined previously. An example beam combining method may include the following steps:

1. Applying the AWVs from the K×N matrix X on a row by row basis to an antenna sub-system to form and scan through (e.g., energize in sequential order) corresponding test beams;
2. Obtaining K channel measurements in the form of a column vector $r=[r_1, r_2, \ldots, r_K]^T$; and
3. Determining the optimal combined beam directional vector $r_{opt}=r^H Z$; where Z is a matrix related to or based on X and $r_{opt}=r^H Z$ $r_{opt}=r^H Z$ corresponds to direction 409 of combined beam 408 in FIG. 4.

In one embodiment, Z may be set equal to X, and the combined beam directional vector $r_{opt}$ is simply the sum of the weighted AWV vectors with weights equal to $r^H$. Another choice of Z is the pseudoinverse of $X^H$. For example, when K is not greater than N, Z may be set equal to $(XX^H)^{-1}X$. This example method may determine the combined beam directional vector (e.g., a phase vector or an AWV) by approximating it using a particular linear combination of the row space of X. In some embodiments, such methods minimize the norm of the difference between the combined beam directional vector and the ideal vector projected onto the row spaces of X. In some other embodiments, the matrix product $XX^H$ may be ill-conditioned when the rows of X are linearly dependent or close to linearly dependent. In such embodiments, the pseudoinverse of $X^H$ may be obtained via its corresponding singular value decomposition (SVD). In some implementations, instead of using all non-zero singular values, singular values below a predetermined minimum value may be set to zero, or only the first few (e.g., less than 5, less than 10, or less than some other predetermined number) singular values may be determined and the remaining singular values truncated or otherwise not calculated.

In other embodiments, Z may be set equal to a minimized mean square error (MMSE) matrix formed from the linear combination coefficients of the rows of X, assuming the optimal combined beam directional vector lies in the row space of X. This form of the matrix Z (e.g., an MMSE matrix) may be determined as follows:

$$Z=((XX^H)^2+\sigma^2 I)^{-1} XX^H X \qquad (2)$$

where $\sigma^2$ represents the noise variance of the measurements, and Z is the MMSE matrix of the test beams based on X. as shown in equation (2). In some embodiments, the noise variance $\sigma^2$ may be determined by an initiator device from channel measurement responses provided by a responder device.

In some embodiments, the AWVs in X are not required to be orthogonal with respect to each other. Therefore, in various embodiments, matrix X is not required to be a square matrix or an orthogonal matrix. To reduce the measurement time, the number of rows in X may be substantially smaller than the number of transmitter and receiver antennas in an antenna array of, for example, adaptive beamforming antennas 526 and 536. To improve the measurement SNR, the number of rows in X (e.g., the number of test beams and test beam AWVs) may be increased for SNR improvement. In some implementations, the AWVs in X may be selected to be close to a prior-determined combined beam directional vector (e.g., in a previous iteration of the method), to improve the system SNR while the channel measurements are being made by the responder device. In various embodiments, the choice of Z=X may be used to simplify the overall system design, such as the compute resources needed to determine the combined beam direction vector, or the combined beam AWV.

From the standpoint of a responder device, an example method for forming a combined beam based on adjacent beam may include the following steps. A responder device may first obtain a test beamform request from an initiator device. After receiving the test beamform request, the responder device provides channel measurement information to the initiator device corresponding to any test beams formed by the initiator device. The channel measurement information may be descriptive of/characterize communication channels between the initiator device and the responder device (e.g., a wireless networking device and a second wireless networking device). In some embodiments, the responder device may be configured to determine a characterization of a combined beam for the initiator device and include it in the channel measurement information provided to the initiator device. The initiator device may gather additional channel measurement information from another device or from the responder device about other test beams directed at different locations. The other device may be a non-participating device or an interferee device that may create interference to a communication channel between the responder device and the initiator device. Based these sets of channel measurement information, the initiator device may form a combined beam directed at the responder device or a location other than the location of the responder device (e.g., to reduce interference to nonparticipating devices). The location may be within a predefined distance away from the location of the responder device, for example. Although not directed straight at the location of the responder device, the combined beam may provide a predefined threshold level of gain to the responder device.

For responder/receiver device training, the optimal combined beam directional vector $r_{opt}$ may be applied at the responder side directly to the antenna array (e.g., as an AWV). For initiator/transmitter device training, either the measurement vector r or the optimal combined beam directional vector $r_{opt}$ may be determined at the device and/or fed back to the device and applied to the device's antenna array accordingly. If the calculation of the optimal beamforming vector $r_{opt}$ via $r_{opt}=r^H Z$ is to be performed in the responder side, the matrix Z may be communicated or predetermined and known by the responder device.

Ideally, the processes to form an optimal combined beam will be performed by both the initiator device and the responder device, one after another, until the convergence to ideal beamforming AWVs for both devices is achieved (e.g., by meeting various criteria, as described herein). In practice, the initiator and responder processes can be performed in whatever order, up to the preference of the system. In various embodiments, the test beam AWV matrix X may be fixed at the beginning of the beamforming process or may be adjusted according to the latest update of $r_{opt}$, as described herein. In one embodiment, the initiator and responder devices may have the same antenna array configuration and the same test beam AWV matrix X can be used for both the initiator and responder devices. In another embodiment, the initiator and responder devices may have different antenna array configurations and/or the test beam AWV matrix X may be different for the initiator and responder devices.

For example, the test beam AWV matrix X may be selected from a very large set of fixed and/or predetermined AWV test beams that are close to the estimated optimal combined beam AWV at that moment of time. Alternatively, the test beam AWV matrix X may be updated as a perturbation of the latest (or earlier) optimal combined beam AWV. Whether or not to update the test beam AWV matrix may be determined dynamically as the optimal combined beam AWV is changed from one iteration of the beamforming process to another. In a linear array as an example, the test beam AWV X may be selected to be different from $r_{opt}$ determined in a previous iteration by the vector of [1 $e^{j\delta\theta_i}$ $e^{2j\delta\theta_i}$ . . . ], where $\delta\theta_i$ may be a set of small angles configured to form a set of test beams deviated from the ideal beam. In practice, a phase shifter of an antenna subsystem (e.g., antenna sub-systems 526 and 536) may not be able to support all possible different phases $k\delta\theta_i$ designated by the set of small angles $\delta\theta_i$ and may need to be quantized to the selection of phases or phase shifts that can be applied by the phase shifter.

In general terms, a method for beamforming in accordance with embodiments of the present disclosure may include forming a fixed test beam from a first device, either initiator or responder (e.g., assuming the optimal beam for that side is current, or using an omnidirectional or semi-omnidirectional beam, for example), forming and scanning through multiple spatially distributed test beams from a second device, measuring corresponding channel responses one after another, and combining the measured channel responses with characterizations of the spatially distributed test beams to form a new optimal combined beam from the second device to the first device. Such combining may be performed at either the first or second device and transmitted to the other. Test beams may be generated by perturbation of the optimal beam from a previous step, as described herein.

In various embodiments, the combining may be based on a weighted sum of the channel responses, where the weights are generated based on the set of the test beams, as described herein. In some embodiments, the weight of each test beam when combining them may be the complex conjugate of the channel response of that test beam (e.g., such as where Z=X, for example). In other embodiments, the weight for the weighted sum may be the complex conjugate of the channel responses and the to-be combined beam may be modified as the row of the pseudoinverse of the matrix composite of the test beam (e.g., such as where $Z=(XX^H)^{-1}X$, for example). In further embodiments, the weight for the weighted sum may be the complex conjugate of the channel response and the to-be combined beam may be modified as the row of the MMSE matrix composite of the test beam (e.g., where $Z=(XX^H)^2+\sigma^2 I)^{-1}XX^H X$, for example). In various embodiments, the optimal combined beam AWV may be quantized to a form suitable to the hardware of an appropriate antenna sub-system. The entire process may be conducted iteratively until initiator and responder converge to their respective optimal beams.

Figure 6:
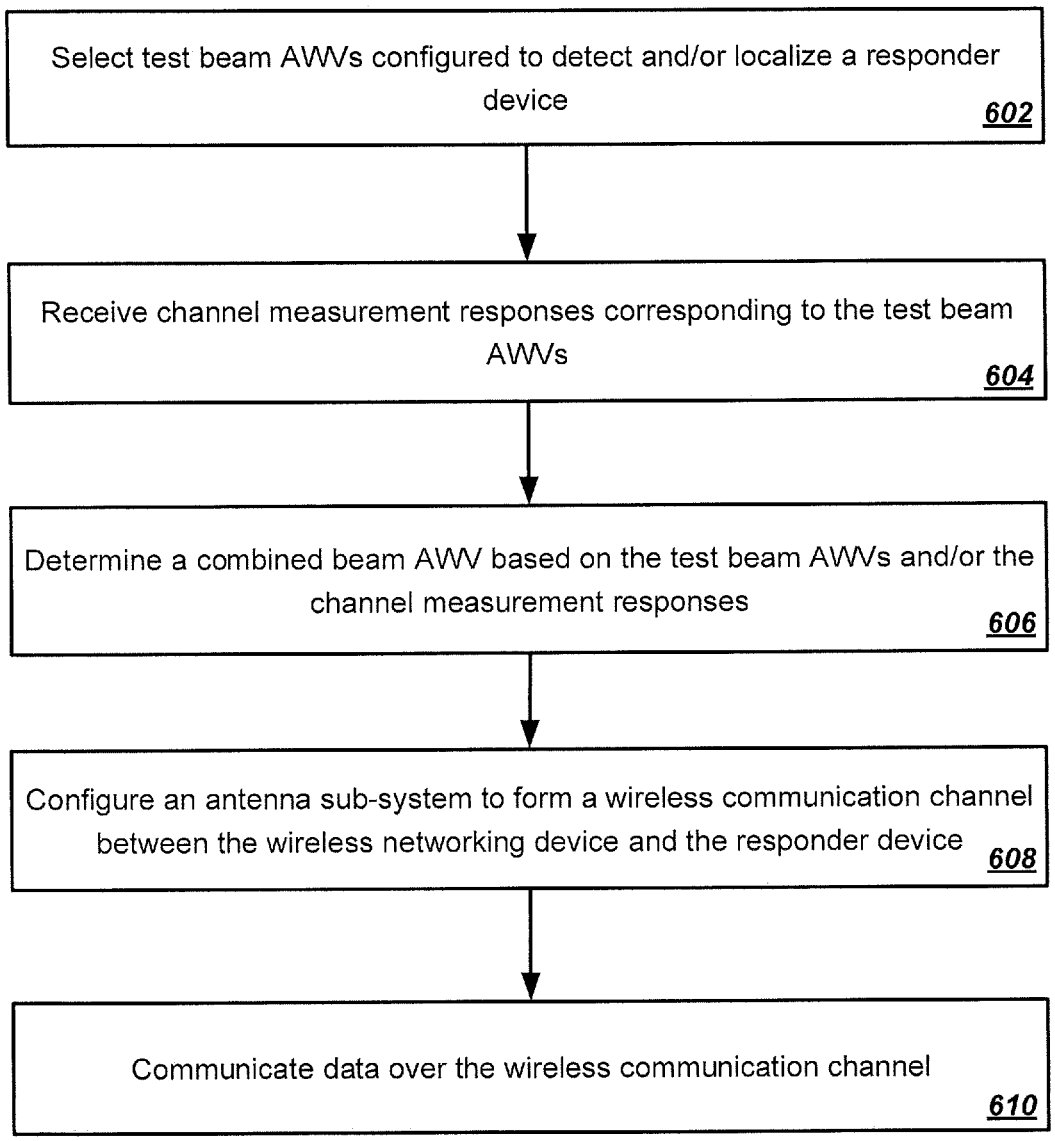
FIG. 6 is a flow chart illustrating an embodiment of an example process for beamforming based on the channel measurements of adjacent beams.

FIG. 6 is a flow chart illustrating an embodiment of an example process 600 for beamforming based on the channel measurements of adjacent beams. In some embodiments, the operations of FIG. 6 may be implemented as software instructions executed by one or more logic devices associated with corresponding electronic devices, sensors, and/or structures depicted in FIGS. 1 through 5. More generally, the operations of FIG. 6 may be implemented with any combination of software instructions and/or electronic hardware (e.g., inductors, capacitors, amplifiers, actuators, antennas, phase adjustors, amplifiers, or other analog and/or digital components). It should be appreciated that any step, sub-step, sub-process, or block of process 600 may be performed in an order or arrangement different from the embodiments illustrated by FIG. 6. For example, in other embodiments, one or more blocks may be omitted from process 600, and other blocks may be included. Furthermore, block inputs, block outputs, various sensor signals, sensor information, calibration parameters, and/or other operational parameters may be stored to one or more memories prior to moving to a following portion of process 600. Although process 600 is described with reference to systems 100, 200, and 500 and FIGS. 1-5, process 600 may be performed by other systems and including a different selection of electronic devices, sensors, assemblies, and/or antenna arrangements. At the initiation of process 600, various system parameters may be populated by prior execution of a process similar to process 600, for example, or may be initialized to zero and/or one or more values corresponding to typical, stored, and/or learned values derived from past operation of process 600, as described herein.

In block 602, a logic device selects test beam AWVs configured to detect and/or localize a responder device. For example, controller 522 of initiator device 520 may be configured to select a set of test beam AWVs (e.g., corresponding to test beams 406-A and 406-B in FIG. 4) configured to detect and/or localize responder device 530. In some embodiments, controller 522 may be configured to select the set of test beam AWVs by adjusting one or more elements of a prior-determined combined beam AWV (e.g., determined by a prior execution of process 600, for example) by corresponding phase perturbation terms, for each test beam AWV in the set of test beam AWVs, where the phase perturbation terms, for each test beam AWV, are selected to produce a set of test beams, corresponding to the set of test beam AWVs, that are spatially distributed substantially within a selected angular diameter centered about the prior-determined combined beam AWV.

In other embodiments, controller 522 may be configured to select the set of test beam AWVs by accumulating a temporal series of two or more prior-determined combined beam AWVs, extrapolating an estimated relative direction to the responder based, at least in part, on the temporal series of prior-determined combined beam AWVs, determining an estimated combined beam AWV corresponding to the estimated relative direction to the responder, and selecting the set of test beam AWVs such that a set of test beams corresponding to the set of test beam AWVs are spatially distributed substantially within a selected angular diameter centered about the estimated combined beam AWV. In some embodiments, controller 522 may be configured to determine a width of the selected angular diameter and/or an angular and/or spatial distribution of the set of test beam AWVs based, at least in part, on the temporal series of two or more prior-determined combined beam AWVs, and to conform the set of test beam AWVs to a set of quantized phases supported by a phase shifter of the antenna sub-system.

In further embodiments, controller 522 may be configured to select the set of test beam AWVs by receiving a set of responder test beam AWVs and/or a responder combined beam AWV from responder device 530 (e.g., determined through a prior execution of a process similar to process 600) and determining the selected set of test beam AWVs based on the set of responder test beam AWVs and/or the responder combined beam AWV received from responder device 530. In various embodiments, controller 522 may be configured to use antenna sub-system 528 to form and scan through a set of test beams corresponding to the set of test beam AWVs prior to moving to block 604.

In block 604, a logic device receives channel measurement responses corresponding to test beam AWVs. For example, controller 522 of initiator device 520 may be configured to receive one or more channel measurement responses corresponding to the set of test beam AWVs selected and/or formed in block 604. In some embodiments, controller 532 of responder device 530 may be configured to provide the one or more channel measurement responses to initiator device 520, responsive to the scan through of the set of test beams in block 602, using one or more wireless test channels formed according to/over one or more of the set of test beam AWVs selected in block 602, similar to wireless communication channel 550 implemented by combined beam 408 formed according to corresponding combined beam AWVs. Other wired or wireless channels may be used to convey channel measurement responses to initiator device 520, including non-beamformed wireless channels, as described herein. In related embodiments, controller 532 may be configured to receive the set of test beam AWVs from initiator device 520, determine a combined beam AWV based on the set of test beam AWVs and corresponding channel measurements, and transmit the combined beam AWV to initiator device 520 as at least a portion of the one or more channel measurement responses corresponding to the set of test beams scanned through by initiator device 520 in block 602.

In block 606, a logic device determines a combined beam AWV based on the test beam AWVs and/or the channel measurement responses. For example, controller 522 of initiator device 520 may be configured to determine a combined beam AWV (e.g., corresponding to combined beam 408) directed substantially towards responder device 530 based, at least in part, on the plurality of test beam AWVs selected and/or formed in block 602 and the corresponding plurality of channel measurement responses received in block 604. In some embodiments, determining the combined beam AWV may include determining individual weight factors corresponding to each of the test beam AWVs based, at least in part, on the channel measurement responses, and determining a vector sum of the set of test beam AWVs weighted according to their corresponding individual weight factors. In various embodiments, each individual weight factor may be based on a complex conjugate of a corresponding channel measurement response.

In other embodiments, determining the combined beam AWV may include determining a pseudoinverse AWV matrix based on the test beam AWVs and determining a vector sum based on the pseudoinverse AWV matrix, where vectors of the vector sum are rows or columns of the pseudoinverse AWV matrix each weighted according to individual weight factors corresponding to each of the test beam AWVs. In further embodiments, determining the combined beam AWV may include determining a minimized mean square error (MMSE) AWV matrix based on the test beam AWVs and determining a vector sum based on the MMSE AWV matrix, where vectors of the vector sum are rows or columns of the MMSE AWV matrix each weighted according to individual weight factors corresponding to each of the test beam AWVs. In alternative embodiments, receiving the one or more channel responses (e.g., block 604) and determining the combined beam AWV (e.g., block 606) may include receiving the combined beam AWV as channel measurement information included as at least a portion of the one or more channel measurement responses received in block 604 and extracting the combined beam AWV from the received one or more channel measurement responses.

In block 608, a logic device configures an antenna subsystem to form a wireless communication channel between the wireless networking device and the responder device. For example, controller 522 of initiator device 520 may be configured to configure antenna sub-system 528 to form wireless communication channel 550 according to the combined beam AWV determined in block 606 between initiator device 520 and responder device 530.

In block 610, a logic device communicates data over the wireless communication channel. For example, controller 522 of initiator device 520 may be configured to communicate data or other signals over wireless communication channel 550 to responder device 530. In one embodiment, controller 522 may be configured to transmit the set of initiator test beam AWVs selected in block 602 and/or the initiator combined beam AWV determined in block 606 to responder device 530. In such embodiments, controller 532 of responder device 530 may be configured to iterate a portion of process 600 and select a set of responder test beam AWVs configured to localize the initiator device, receive a set of initiator channel measurement responses corresponding to the set of responder test beam AWVs, determine a responder combined beam AWV directed substantially towards initiator device 520 based, at least in part, on the set of responder test beam AWVs and the corresponding set of initiator channel measurement responses, and configure antenna sub-system 538 to form wireless communication channel 550 according to the determined responder combined beam AWV between responder device 530 and initiator device 520.

In related embodiments, controller 532 of responder device 530 may be configured to determine the selected set of responder test beam AWVs based on the set of initiator test beam AWVs and/or the initiator combined beam AWV received from initiator device 520. Controller 532 of responder device 530 may be configured to receive the set of initiator test beam AWVs and/or the initiator combined beam AWV from initiator device 520 after transmitting the responder channel measurement responses received by initiator device 520 in block 604. Controller 532 may also be configured to transmit a set of responder test beam AWVs and/or a responder combined beam AWV to initiator device 520.

In various embodiments, test beams may be formed in relation to a non-participating device, e.g., to determine potential interference that the non-participating device may cause between the initiator device and a responder device. If the non-participating device causes interference with a wireless communication channel between an initiator device and a responder device, then the non-participating device may be referred to as an interferee device. Alternatively, test beams may be formed in relation to a responder device, e.g., to determine the location of the responder device, as well as channel measurement information of a potential communication channel between the responder device and the transmitter device. In various embodiments, at least two test beams are formed in relation to a responder device. The test beams may include those formed at locations that are within predefined proximities to the responder device.

Figure 7:
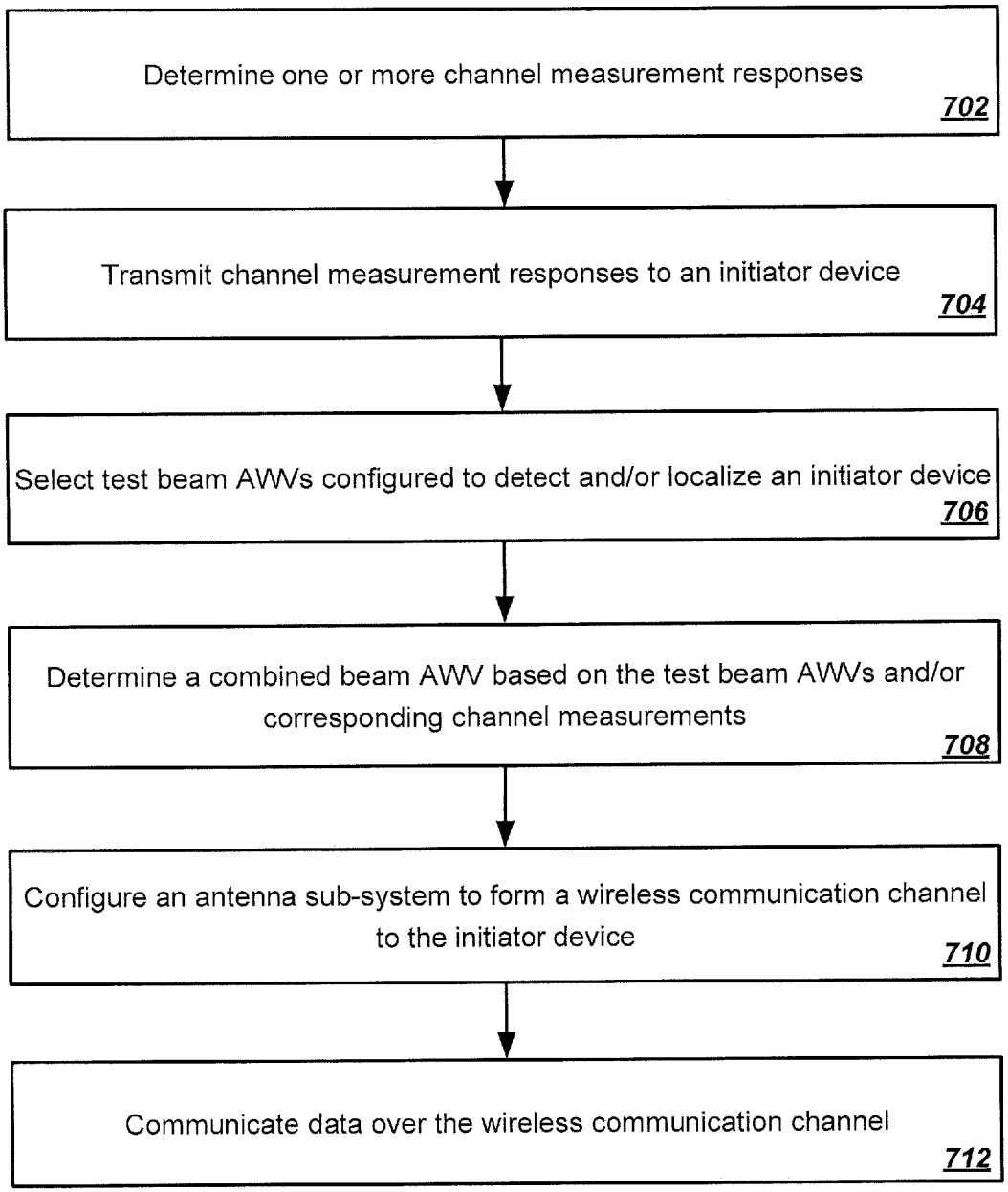
FIG. 7 is a flow chart illustrating an embodiment of an example process for beamforming based on the channel measurements of adjacent beams.

FIG. 7 is a flow chart illustrating an embodiment of an example process 700 for beamforming based on the channel measurements of adjacent beams. In some embodiments, the operations of FIG. 7 may be implemented as software instructions executed by one or more logic devices associated with corresponding electronic devices, sensors, and/or structures depicted in FIGS. 1 through 5. More generally, the operations of FIG. 7 may be implemented with any combination of software instructions and/or electronic hardware (e.g., inductors, capacitors, amplifiers, actuators, antennas, phase adjustors, amplifiers, or other analog and/or digital components). It should be appreciated that any step, sub-step, sub-process, or block of process 700 may be performed in an order or arrangement different from the embodiments illustrated by FIG. 7. For example, in other embodiments, one or more blocks may be omitted from process 700, and other blocks may be included. Furthermore, block inputs, block outputs, various sensor signals, sensor information, calibration parameters, and/or other operational parameters may be stored to one or more memories prior to moving to a following portion of process 700. Although process 700 is described with reference to systems 100, 200, and 500 and FIGS. 1-5, process 700 may be performed by other systems and including a different selection of electronic devices, sensors, assemblies, and/or antenna arrangements. At the initiation of process 700, various system parameters may be populated by prior execution of a process similar to process 700, for example, or may be initialized to zero and/or one or more values corresponding to typical, stored, and/or learned values derived from past operation of process 700, as described herein.

In block 702, a logic device determines one or more channel measurement responses. For example, controller 532 of responder device 530 may receive a test beamform request from initiator device 520 that proceeds to perform block 602 of FIG. 6. Controller 532 may be configured to perform channel measurements corresponding to a plurality of initiator test beams scanned through by initiator device 520 and determine one or more responder channel measurement responses. In some embodiments, the one or more responder channel measurement responses may include channel measurement information indicating different signal strengths and/or other characteristics of the individual initiator test beams and corresponding initiator test beam channel measurements performed by responder device 530, as described herein. In other embodiments, controller 532 may be configured to determine initiator test beam AWVs corresponding to the initiator test beams and determine an initiator combined beam AWV based, at least in part, on the initiator test beam AWVs and the initiator test beam channel measurements. For example, controller 532 may be configured to determine the initiator test beam AWVs by receiving them from the initiator device (e.g., as part of the test beamform request and/or as part of other communications, for example) and/or by selecting them from a pre-determined or shared set of initiator test beam AWVs. In such embodiments, the initiator combined beam AWV may form at least a portion of the one or more responder channel measurement responses.

In block 704, a logic device transmits one or more channel measurement responses to an initiator device. For example, controller 532 of responder device 530 may be configured to transmit the one or more channel measurement responses determined in block 702 to initiator device 520, using a wired or wireless communication channel, as described herein. In some embodiments, the one or more responder channel measurement responses may include channel measurement information indicating different signal strengths and/or other characteristics of the individual initiator test beams and corresponding initiator test beam channel measurements performed by responder device 530, as described herein, which may be further processed by initiator device 520 to determine an initiator combined beam AWV. In other embodiments, the one or more responder channel measurement responses may include an initiator combined beam AWV determined by responder device 530, which may be transmitted to initiator device 520 as at least a portion of the one or more responder channel measurement responses and then used by initiator device 520 to configure antenna sub-system 528 to form a fixed initiator test beam and/or a wireless communication channel to responder device 530.

In block 706, a logic device selects test beam AWVs configured to localize an initiator device. For example, controller 532 of responder device 530 may be configured to select a set of responder test beam AWVs (e.g., similar to test beams 406-A and 406-B in FIG. 4, but using receiver beams rather than transmitter beams) configured to localize initiator device 520. In some embodiments, controller 532 may be configured to select the set of responder test beam AWVs by adjusting one or more elements of a prior-determined responder combined beam AWV (e.g., determined by a prior execution of process 700, for example) by corresponding phase perturbation terms, for each responder test beam AWV in the set of responder test beam AWVs, where the phase perturbation terms, for each responder test beam AWV, are selected to produce a set of responder test beams, corresponding to the set of responder test beam AWVs, that are spatially distributed substantially within a selected angular diameter centered about the prior-determined responder combined beam AWV.

In other embodiments, controller 532 may be configured to select the set of responder test beam AWVs by accumulating a temporal series of two or more prior-determined responder combined beam AWVs, extrapolating an estimated relative direction to the initiator based, at least in part, on the temporal series of prior-determined responder combined beam AWVs, determining an estimated responder combined beam AWV corresponding to the estimated relative direction to the initiator, and selecting the set of responder test beam AWVs such that a set of responder test beams corresponding to the set of responder test beam AWVs are spatially distributed substantially within a selected angular diameter centered about the estimated responder combined beam AWV. In some embodiments, controller 532 may be configured to determine a width of the selected angular diameter and/or an angular and/or spatial distribution of the set of responder test beam AWVs based, at least in part, on the temporal series of two or more prior-determined responder combined beam AWVs, and to conform the set of responder test beam AWVs to a set of quantized phases supported by a phase shifter of the antenna sub-system.

In further embodiments, controller 532 may be configured to select the set of responder test beam AWVs by receiving a set of initiator test beam AWVs and/or an initiator combined beam AWV from initiator device 520 (e.g., determined through a prior execution of a process similar to process 600) and determining the selected set of responder test beam AWVs based on the set of initiator test beam AWVs and/or the initiator combined beam AWV received from initiator device 520. In various embodiments, controller 532 may be configured to use antenna sub-system 538 to form and scan through a set of responder test beams corresponding to the set of responder test beam AWVs prior to moving to block 708. It should be understood that in some embodiments, block 706 and subsequent blocks may be performed without first performing blocks 702 and 704.

In block 708, a logic device determines a combined beam AWV based on the test beam AWVs and/or corresponding channel measurements. For example, controller 532 of responder device 530 may be configured to determine a responder combined beam AWV (e.g., similar to combined beam 408) directed substantially towards initiator device 520 based, at least in part, on the plurality of responder test beam AWVs selected and/or formed in block 706 and corresponding responder test beam channel measurements (e.g., performed in block 706 and/or 708), as described herein. In some embodiments, determining the responder combined beam AWV may include determining individual weight factors corresponding to each of the responder test beam AWVs based, at least in part, on the responder test beam channel measurements, and determining a vector sum of the set of responder test beam AWVs weighted according to their corresponding individual weight factors. In various embodiments, each individual weight factor may be based on a complex conjugate of a corresponding responder test beam channel measurement.

In other embodiments, determining the responder combined beam AWV may include determining a pseudoinverse AWV matrix based on the responder test beam AWVs and determining a vector sum based on the pseudoinverse AWV matrix, where vectors of the vector sum are rows or columns of the pseudoinverse AWV matrix each weighted according to individual weight factors corresponding to each of the responder test beam AWVs. In further embodiments, determining the responder combined beam AWV may include determining a minimized mean square error (MMSE) AWV matrix based on the responder test beam AWVs and determining a vector sum based on the MMSE AWV matrix, where vectors of the vector sum are rows or columns of the MMSE AWV matrix each weighted according to individual weight factors corresponding to each of the responder test beam AWVs.

In block 710, a logic device configures an antenna sub-system to form a wireless communication channel to an initiator device. For example, controller 532 of responder device 530 may be configured to configure antenna sub-system 538 to form wireless communication channel 550 according to the responder combined beam AWV determined in block 708 between initiator device 520 and responder device 530.

In block 712, a logic device communicates data over a wireless communication channel. For example, controller 532 of responder device 530 may be configured to communicate data or other signals over wireless communication channel 550 to initiator device 520. In one embodiment, controller 532 may be configured to transmit the set of responder test beam AWVs selected in block 706 and/or the responder combined beam AWV determined in block 708 to initiator device 520. In such embodiments, controller 522 of initiator device 520 may be configured to iterate a portion of process 600 or 700 and select a set of responder test beam AWVs configured to localize the responder device, receive a set of responder channel measurement responses corresponding to the set of initiator test beam AWVs, determine an initiator combined beam AWV directed substantially towards responder device 530 based, at least in part, on the set of initiator test beam AWVs and the corresponding set of responder channel measurement responses, and configure antenna sub-system 528 to form wireless communication channel 550 according to the determined initiator combined beam AWV between responder device 530 and initiator device 520.

In various embodiments, responder test beams may be formed in relation to a non-participating device, e.g., to determine potential interference that the non-participating device may cause between the initiator device and a responder device. Alternatively, responder test beams may be formed in relation to an initiator device, e.g., to determine the location of the initiator device, as well as channel measurement information of a potential communication channel between the responder device and the transmitter device. In various embodiments, at least two responder test beams are formed in relation to an initiator device. The responder test beams may include those formed at locations that are within predefined proximities to the initiator device.

Thus, by streamlining the beamforming processes and including the capability of combining multiple test beams to form an idealized combined beam, embodiments of the present disclosure provide relatively fast and accurate beamforming as compared to conventional techniques, which results in increases in both the instantaneous and time averaged gain, bandwidth, and/or channel quality seen by devices in a wireless communication network. Moreover, the increased speed and accuracy of the beamforming also allows embodiments to form and maintain wireless communications networks using less power and/or compute resources than that used by conventional methodologies, particularly in environments with many devices where beam accuracy helps to reduce overall noise and interference in the network transmissions, particularly in networks comprising a number of mobile devices all attempting to utilize the network substantially concurrently.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A wireless networking device, comprising:
an antenna sub-system configured to at least transmit beamformed wireless transmissions; and
a controller configured to:
select a plurality of test beam antenna weight vectors (AWVs) configured at least to detect, to localize, or to detect and localize a responder device;
receive one or more channel measurement responses corresponding to the plurality of test beam AWVs;
determine a combined beam AWV directed substantially towards the responder device and partially away from the responder device by combining the plurality of test beam AWVs within an angular diameter centered about the responder device, based at least in part on corresponding one or more channel measurement responses, wherein the combined beam AWV is configured to reduce interference at a device other than the responder device; and
configure the antenna sub-system to form a wireless communication channel according to the determined combined beam AWV between the wireless networking device and the responder device; and
wherein the determining the combined beam AWV comprises:
determining individual weight factors corresponding to each of the plurality of test beam AWVs based, at least in part, on the one or more channel measurement responses; and
determining a vector sum of the plurality of test beam AWVs weighted according to their corresponding individual weight factors.

2. The wireless networking device of claim 1, wherein:
each individual weight factor is based on a complex conjugate of a corresponding channel measurement response of the one or more channel measurement responses.

3. A wireless networking device, comprising:
an antenna sub-system configured to at least transmit beamformed wireless transmissions; and
a controller configured to:
select a plurality of test beam antenna weight vectors (AWVs) configured at least to detect, to localize, or to detect and localize a responder device;
receive one or more channel measurement responses corresponding to the plurality of test beam AWVs;
determine a combined beam AWV directed substantially towards the responder device and partially away from the responder device by combining the plurality of test beam AWVs within an angular diameter centered about the responder device, based at least in part on corresponding one or more channel measurement responses, wherein the combined beam AWV is configured to reduce interference at a device other than the responder device; and
configure the antenna sub-system to form a wireless communication channel according to the determined combined beam AWV between the wireless networking device and the responder device, and
wherein the determining the combined beam AWV comprises:
determining a pseudoinverse AWV matrix based on the plurality of test beam AWVs; and
determining a vector sum based on the pseudoinverse AWV matrix, wherein vectors of the vector sum comprise rows or columns of the pseudoinverse AWV matrix each weighted according to individual weight factors corresponding to each of the plurality of test beams AWVs.

4. A wireless networking device, comprising:
an antenna sub-system configured to at least transmit beamformed wireless transmissions; and
a controller configured to:
select a plurality of test beam antenna weight vectors (AWVs) configured at least to detect, to localize, or to detect and localize a responder device;
receive one or more channel measurement responses corresponding to the plurality of test beam AWVs;
determine a combined beam AWV directed substantially towards the responder device and partially away from the responder device by combining the plurality of test beam AWVs within an angular diameter centered about the responder device, based at least in part on corresponding one or more channel measurement responses, wherein the combined beam AWV is configured to reduce interference at a device other than the responder device, and
configure the antenna sub-system to form a wireless communication channel according to the determined combined beam AWV between the wireless networking device and the responder device, and
wherein the determining the combined beam AWV comprises:
determining a minimized mean square error (MMSE) AWV matrix based on the plurality of test beam AWVs; and
determining a vector sum based on the MMSE AWV matrix, wherein vectors of the vector sum comprise rows or columns of the MMSE AWV matrix each weighted according to individual weight factors corresponding to each of the plurality of test beams AWVs.

5. A wireless networking device, comprising:
an antenna sub-system configured to at least transmit beamformed wireless transmissions; and
a controller configured to:
select a plurality of test beam antenna weight vectors (AWVs) configured at least to detect, to localize, or to detect and localize a responder device;
receive one or more channel measurement responses corresponding to the plurality of test beam AWVs;
determine a combined beam AWV directed substantially towards the responder device and partially away from the responder device by combining the plurality of test beam AWVs within an angular diameter centered about the responder device, based at least in part on corresponding one or more channel measurement responses, wherein the combined beam AWV is configured to reduce interference at a device other than the responder device, and
configure the antenna sub-system to form a wireless communication channel according to the determined combined beam AWV between the wireless networking device and the responder device, and
wherein the selecting the plurality of test beam AWVs comprises:
adjusting one or more elements of a prior-determined combined beam AWV by corresponding one or more phase perturbation terms, for each test beam AWV in the plurality of test beam AWVs, wherein the one or more phase perturbation terms, for each test beam AWV, are selected to produce a plurality of test beams corresponding to the plurality of test beam AWVs that are spatially distributed substantially within a selected angular diameter centered about the prior-determined combined beam AWV.

6. A wireless networking device, comprising:
an antenna sub-system configured to at least transmit beamformed wireless transmissions; and
a controller configured to:
select a plurality of test beam antenna weight vectors (AWVs) configured at least to detect, to localize, or to detect and localize a responder device;
receive one or more channel measurement responses corresponding to the plurality of test beam AWVs;
determine a combined beam AWV directed substantially towards the responder device and partially away from the responder device by combining the plurality of test beam AWVs within an angular diameter centered about the responder device, based at least in part on corresponding one or more channel measurement responses, wherein the combined beam AWV is configured to reduce interference at a device other than the responder device, and
configure the antenna sub-system to form a wireless communication channel according to the determined combined beam AWV between the wireless networking device and the responder device, and
wherein the selecting the plurality of test beam AWVs comprises:
accumulating a temporal series of two or more prior-determined combined beam AWVs;
extrapolating an estimated relative direction to the responder device based, at least in part, on the temporal series of two or more prior-determined combined beam AWVs;
determining an estimated combined beam AWV corresponding to the estimated relative direction to the responder device; and
selecting the plurality of test beam AWVs such that a plurality of test beams corresponding to the plurality of test beam AWVs are spatially distributed substantially within a selected angular diameter centered about the estimated combined beam AWV.

7. The wireless networking device of claim 6, wherein the controller is configured to:
determine at least one of a width of a selected angular diameter and an angular and/or spatial distribution of the selected plurality of test beam AWVs based, at least in part, on the temporal series of two or more prior-determined combined beam AWVs; and
conform the selected plurality of test beam AWVs to a set of quantized phases supported by a phase shifter of the antenna sub-system.

8. A method, comprising:
selecting a plurality of test beam antenna weight vectors (AWVs) configured at least to detect, to localize, or to detect and localize a responder device;
receiving one or more channel measurement responses corresponding to the plurality of test beam AWVs;
determining a combined beam AWV directed substantially towards the responder device and partially away from the responder device by combining the plurality of test beam AWVs within an angular diameter centered about the responder device, based at least in part on the one or more channel measurement responses, wherein the combined beam is configured to reduce interference at a device other than the responder device; and
configuring an antenna sub-system to form a wireless communication channel according to the determined combined beam AWV between a wireless networking device and the responder device; and wherein the determining the combined beam AWV comprises:
determining individual weight factors corresponding to each of the plurality of test beam AWVs based, at least in part, on the one or more channel measurement responses; and
determining a vector sum of the plurality of test beam AWVs weighted according to their corresponding individual weight factors.

9. The method of claim 8, wherein:
each individual weight factor is based on a complex conjugate of a corresponding channel measurement response of the one or more channel measurement responses.

10. A method, comprising:
selecting a plurality of test beam antenna weight vectors (AWVs) configured at least to detect, to localize, or to detect and localize a responder device;
receiving one or more channel measurement responses corresponding to the plurality of test beam AWVs;
determining a combined beam AWV directed substantially towards the responder device and partially away from the responder device by combining the plurality of test beam AWVs within an angular diameter centered about the responder device, based at least in part on the one or more channel measurement responses, wherein the combined beam is configured to reduce interference at a device other than the responder device; and
configuring an antenna sub-system to form a wireless communication channel according to the determined combined beam AWV between a wireless networking device and the responder device, and
wherein the determining the combined beam AWV comprises:
determining a pseudoinverse AWV matrix based on the plurality of test beam AWVs; and
determining a vector sum based on the pseudoinverse AWV matrix, wherein vectors of the vector sum comprise rows or columns of the pseudoinverse AWV matrix each weighted according to individual weight factors corresponding to each of the plurality of test beams AWVs.

11. A method, comprising:
selecting a plurality of test beam antenna weight vectors (AWVs) configured at least to detect, to localize, or to detect and localize a responder device;
receiving one or more channel measurement responses corresponding to the plurality of test beam AWVs;
determining a combined beam AWV directed substantially towards the responder device and partially away from the responder device by combining the plurality of test beam AWVs within an angular diameter centered about the responder device, based at least in part on the one or more channel measurement responses, wherein the combined beam is configured to reduce interference at a device other than the responder device; and
configuring an antenna sub-system to form a wireless communication channel according to the determined combined beam AWV between a wireless networking device and the responder device, and
wherein the determining the combined beam AWV comprises:
determining a minimized mean square error (MMSE) AWV matrix based on the plurality of test beam AWVs; and determining a vector sum based on the MMSE AWV matrix, wherein vectors of the vector sum comprise rows or columns of the MMSE AWV matrix each weighted according to individual weight factors corresponding to each of the plurality of test beams AWVs.

12. A method, comprising:
selecting a plurality of test beam antenna weight vectors (AWVs) configured at least to detect, to localize, or to detect and localize a responder device;
receiving one or more channel measurement responses corresponding to the plurality of test beam AWVs;
determining a combined beam AWV directed substantially towards the responder device and partially away from the responder device by combining the plurality of test beam AWVs within an angular diameter centered about the responder device, based at least in part on the one or more channel measurement responses, wherein the combined beam is configured to reduce interference at a device other than the responder device; and
configuring an antenna sub-system to form a wireless communication channel according to the determined combined beam AWV between a wireless networking device and the responder device, and
wherein the selecting the plurality of test beam AWVs comprises:
adjusting one or more elements of a prior-determined combined beam AWV by corresponding one or more phase perturbation terms, for each test beam AWV in the plurality of test beam AWVs, wherein the one or more phase perturbation terms, for each test beam AWV, are selected to produce a plurality of test beams corresponding to the plurality of test beam AWVs that are spatially distributed substantially within a selected angular diameter centered about the prior-determined combined beam AWV.

13. A method, comprising:
selecting a plurality of test beam antenna weight vectors (AWVs) configured at least to detect, to localize, or to detect and localize a responder device;
receiving one or more channel measurement responses corresponding to the plurality of test beam AWVs;
determining a combined beam AWV directed substantially towards the responder device and partially away from the responder device by combining the plurality of test beam AWVs within an angular diameter centered about the responder device, based at least in part on the one or more channel measurement responses, wherein the combined beam is configured to reduce interference at a device other than the responder device; and
configuring an antenna sub-system to form a wireless communication channel according to the determined combined beam AWV between a wireless networking device and the responder device, and
wherein the selecting the plurality of test beam AWVs comprises:
accumulating a temporal series of two or more prior-determined combined beam AWVs;
extrapolating an estimated relative direction to the responder device based, at least in part, on the temporal series of two or more prior-determined combined beam AWVs;
determining an estimated combined beam AWV corresponding to the estimated relative direction to the responder device; and selecting the plurality of test beam AWVs such that a plurality of test beams corresponding to the plurality of test beam AWVs are spatially distributed substantially within a selected angular diameter centered about the estimated combined beam AWV.

14. The method of claim 13, further comprising:

determining at least one of a width of a selected angular diameter and an angular and/or spatial distribution of the selected plurality of test beam AWVs based, at least in part, on the temporal series of two or more prior-determined combined beam AWVs; and conforming the selected plurality of test beam AWVs to a set of quantized phases supported by a phase shifter of the antenna sub-system.

* * * * *